United States Patent [19]
Emery

[11] 3,789,591
[45] Feb. 5, 1974

[54] POWER LAWNMOWER WITH AUXILIARY FLEXIBLE DRIVE SHAFT FOR EDGER HEAD

[76] Inventor: Norman B. Emery, Rt. No. 2, Box 263, Punta Gorda, Fla. 33950

[22] Filed: Apr. 11, 1973

[21] Appl. No.: 350,191

[52] U.S. Cl. .................................. 56/16.9, 56/11.5
[51] Int. Cl. ............................................. A01d 35/20
[58] Field of Search .. 56/255, 256, 11.5, 17.6, 16.9, 56/13.7, 16.7

[56] References Cited
UNITED STATES PATENTS

| | | | |
|---|---|---|---|
| 3,012,390 | 12/1961 | Caskin | 56/17.6 |
| 2,707,858 | 5/1955 | Norton et al. | 56/11.5 |
| 2,790,292 | 4/1957 | Trecker | 56/16.9 |
| 3,053,035 | 9/1962 | Earley | 56/256 |
| 3,319,406 | 5/1967 | Miles | 56/13.7 |

Primary Examiner—Russell R. Kinsey
Attorney, Agent, or Firm—Walter S. Pawl

[57] ABSTRACT

The lawnmower is of the type that has a flat cylindrical housing over a set of rotating blades mounted on a vertical shaft which is driven by a motor carried on the housing. As the mower is moved over the grass, holding the cutter blades at a controlled clearance above the ground, the blades cut the grass to the corresponding height. The vertical shaft is provided with a friction disc mounted thereon for rotation in the housing space above the cutter blades, and a friction wheel is mounted on a horizontal shaft in a pivotal bearing sleeve supported on top of the housing so that the wheel may be spring pressed, through an opening in the housing, to hold the wheel in friction drive relation against said disc. A flexible drive shaft extends from the end of said horizontal shaft through a flexible casing having a rigid tubular handle portion at its outer end to serve as a handle for cutter head.

1 Claim, 1 Drawing Figure

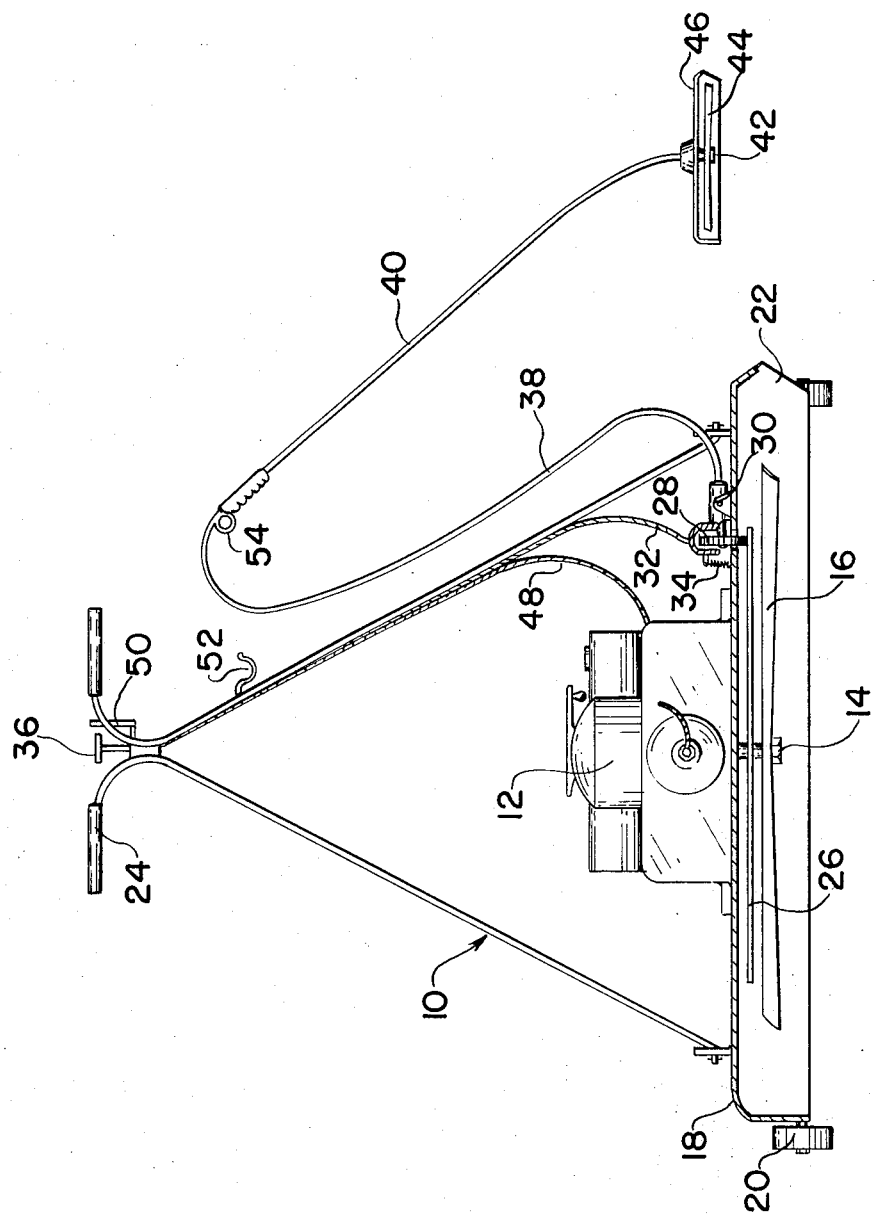

POWER LAWNMOWER WITH AUXILIARY FLEXIBLE DRIVE SHAFT FOR EDGER HEAD

BACKGROUND OF THE INVENTION

This invention relates generally to tools with auxiliary drives for other tools, more specifically for driving edge mowers or trimmers, using the same power source which drives the main tool, such as a lawnmower.

Generally the two basic operations in the care of a lawn, for example, are the mowing and edging operations. It is not uncommon for the typical home owner to have both a power mower and a power edger. Recently, various devices have been developed which are directed towards the provision of a single machine which would be satisfactorily operable for performing both of these operations. One of the problems in such devices has been that they are complicated, and the edger is rigidly mounted on the lawnmower. The drive usually includes belts, chains or other drive means which are difficult to keep in proper working order free from clogging up with grass cuttings and from interference with the lawn mowing action.

Since the edger is mounted at one side of the lawnmower, its use is restricted to the paths which can accommodate the corresponding side of the lawnmower, whereas much of the trimming is often required in adjacent areas which cannot be reached by this edger.

BRIEF SUMMARY OF THE INVENTION

It is therefore an object of the present invention to provide rotary lawnmowers with an auxiliary flexible drive shaft having a friction wheel at its inner end for engagement with a friction disc mounted on the mower drive shaft, and an edger or trimmer head connected for driving thereby at its outer end.

Other and more specific objects will appear in the following detailed description of the invention.

BRIEF DESCRIPTION OF THE DRAWING

The single FIGURE of the drawing illustrates a preferred form of the invention as applied to a rotary lawnmower.

DETAILED DESCRIPTION OF THE INVENTION

As shown in the drawing, the lawnmower 10 has a power motor 12 with a drive shaft 14 provided with the cutting blades 16 operating within a protective hood 18 which has a flat top through which the drive shaft 14 is extended to position the rotating blades 16 at the proper clearance above the ground corresponding to the desired height of the cut grass.

The hood and motor are carried at a level over the ground as determined by the wheels or rollers 20 mounted on the lawnmower suspension. An exit for the grass cuttings is shown at 22 on the side of the lawnmower.

A friction disc 26 is mounted on the drive shaft 14 in the clearance between the blades 16 and the top of the hood 18, and a friction wheel 28 has a shaft mounted in a bearing sleeve which is pivotally mounted at 30 on support brackets which are fixed to the top of the hood 18.

The bearing sleeve has a protective hood portion over the friction wheel and a spring 34 for biasing the wheel into frictional engagement with the disc 26 through an opening in the top of the hood 18. A control line 32 extends from the hood of the friction wheel to the control 36 mounted on the handle bars 24 so as to be convenient for the operator. Control 36 has two positions: one for normally holding the friction wheel off the disc, and the other for releasing the wheel to make frictional contact with the disc to rotate its drive shaft.

A flexible drive shaft 38 extends from the drive shaft of the friction wheel, and has a rigid tubular casing at its outer end portion long enough to serve as a handle 40 for a timmer head connected thereto.

The trimmer head illustrated has a hood 46 similar to hood 18 but is much smaller, and protects the small rotary blades 44 mounted on the end of shaft 42 which is connected to the outer end of the flexible shaft, in the coupling at the end of the handle 40.

A control line 48 extends from the power motor 12 to the hand control 50 at the handle bars for controlling the motor speed.

A hook 52 mounted on the lawnmower near the handle bars is adapted to receive the eyelet 54 on the grip end of handle 40 to normally support the auxiliary tool when not in use.

The trimmer head may obviously be replaced by various other tool heads, such as for drills, buffers, sanders, pumps etc., if desired.

MODE OF OPERATION OF THE INVENTION

This auxiliary power edger may be used with either a pusher type of lawnmowers, as shown, or with a tractor type, with or without a seat for the operator. In any case, he can operate the lawnmower by itself, or additionally use the trimmer or other tool, when desired, by removing it from its hook 52, and guiding the tool anywhere within reach of the flexible drive shaft from the erstwhile location of the lawnmower.

Where there is no need for cutting grass, but the use of the auxiliary tool is required, the lawnmower can still be used as a portable power tool of the type desired, which may be moved to the required places.

Many obvious modifications in the details and specific arrangement of parts of this device may be made without departing from the spirit and scope of the present invention.

What is claimed is:

1. A power lawnmower having a hood which supports a drive shaft that drives cutter blades mounted thereon, an auxiliary hand tool, with flexible drive means therefor, operatively connected to said drive shaft, hanger means on said lawnmower for normally hanging said hand tool thereon when not in use, said flexible drive means comprising a friction disc mounted on said drive shaft within said hood, said hood having an opening in its upper portion, a friction wheel having a shaft, a bearing supporting said friction wheel shaft and being mounted pivotally on said hood for adjustment of said wheel against said friction disc, through said hood opening, for operation thereby when desired, and a flexible drive shaft extending between said wheel shaft and said hand tool.

* * * * *